United States Patent [19]

Johnson et al.

[11] Patent Number: 5,368,889
[45] Date of Patent: Nov. 29, 1994

[54] METHOD OF MAKING THIN FILM COMPOSITE MEMBRANES

[75] Inventors: David R. Johnson; Kenneth J. Stutts; Daniel A. Batzel; Virginia A. Hallfrisch; James E. Anschutz, all of Midland, Mich.

[73] Assignee: The Dow Chemical Company, Midland, Mich.

[21] Appl. No.: 48,689

[22] Filed: Apr. 16, 1993

[51] Int. Cl.⁵ .............................................. B01D 61/02
[52] U.S. Cl. .................................. 427/244; 427/348; 427/353; 427/245
[58] Field of Search ............ 427/348, 244, 245, 353, 427/354

[56] References Cited

U.S. PATENT DOCUMENTS

| | | | |
|---|---|---|---|
| 3,384,503 | 5/1968 | Stevenson | 427/353 |
| 3,692,570 | 9/1972 | Träubel et al. | 427/245 |
| 3,914,358 | 10/1975 | Dixon et al. | 427/401 |
| 4,002,783 | 1/1977 | Fleissner | 427/354 |
| 4,005,230 | 1/1977 | Fleissner | 427/354 |
| 4,039,440 | 8/1977 | Cadotte | 210/23 H |
| 4,169,174 | 9/1979 | Bixby | 427/353 |
| 4,259,183 | 3/1981 | Cadotte | 210/654 |
| 4,277,344 | 7/1981 | Cadotte | 210/654 |
| 4,329,763 | 5/1982 | Alexander et al. | 427/354 |
| 4,387,024 | 6/1983 | Kurihara et al. | 210/490 |
| 4,520,044 | 5/1985 | Sundet | 427/244 |
| 4,529,646 | 7/1985 | Sundet | 428/315.5 |
| 4,749,488 | 6/1988 | Arthur et al. | 210/490 |
| 4,758,343 | 7/1988 | Saki et al. | 210/500.28 |
| 4,761,234 | 8/1988 | Uemura et al. | 210/500.38 |
| 4,769,148 | 9/1988 | Fibiger et al. | 210/500.38 |
| 4,783,346 | 11/1988 | Sundet | 427/244 |
| 4,828,708 | 5/1989 | Bray | 210/654 |
| 4,830,885 | 5/1989 | Tran et al. | 427/245 |
| 4,857,363 | 8/1989 | Sasaki et al. | 427/245 |
| 4,859,384 | 8/1989 | Fibiger et al. | 264/45.1 |
| 4,902,424 | 2/1990 | Wrasidlo | 210/500.36 |
| 4,948,506 | 8/1990 | Lonsdale et al. | 210/490 |
| 4,948,507 | 8/1990 | Tomaschke | 210/500.38 |
| 4,960,517 | 10/1990 | Cadotte | 210/639 |
| 4,960,518 | 10/1990 | Cadotte et al. | 210/639 |
| 4,980,061 | 12/1990 | Tadros et al. | 210/490 |
| 5,015,380 | 5/1991 | Sundet | 210/490 |
| 5,015,382 | 5/1991 | Sundet | 210/490 |
| 5,051,178 | 9/1991 | Uemura et al. | 210/500.38 |
| 5,069,945 | 12/1991 | Wrasidlo | 427/245 |
| 5,147,553 | 9/1992 | Waite | 210/654 |
| 5,258,202 | 11/1993 | Pellegrino et al. | 427/244 |
| 5,258,203 | 11/1993 | Aurthur | 427/245 |
| 5,271,843 | 12/1993 | Chau et al. | 427/245 |

FOREIGN PATENT DOCUMENTS

0503596A2  9/1992  European Pat. Off.

*Primary Examiner*—Shrive Beck
*Assistant Examiner*—Diana Dudash

[57] ABSTRACT

A method of making a semipermeable composite membrane comprising a discriminating layer formed insitu by interfacial polymerization is disclosed. The method provides for removal of a water immiscible solvent for a reactant in the interfacial polymerization by physical means not requiring a phase change such as a water knife, air knife, roller, or rubber blade. Composite membranes having good flux, good salt rejection, and low levels of remaining organic solvent are obtained.

11 Claims, 1 Drawing Sheet

METHOD OF MAKING THIN FILM COMPOSITE MEMBRANES

Background of the Invention

This invention relates to permselective barriers in the form of thin films or composites thereof. An aspect of this invention relates to aromatic polyamide discriminating layers prepared on porous supports suitable for reverse osmosis desalination of aqueous solutions containing dissolved solutes. An aspect of this invention relates to a process for the preparation of interfacially polymerized aromatic polyamide discriminating layers on porous supports and to the use of such membranes for the separation of fluid mixtures into components thereof.

An improved method, in terms of safety, environmental responsibility and cost effectiveness, for making a semipermeable thin film composite comprising a microporous substrate and an ultra-thin, crosslinked, discriminating layer comprising a polyamide or other suitable polymer, is also disclosed.

Reverse osmosis membranes, and particularly interfacially polymerized polyamide thin film composite membranes, are known. U.S. Pat. No. 4,277,344 discloses a polyamide thin film composite membrane prepared from polyamine monomer and polyfunctional acyl halide monomer. Typically the membranes there provided are useful for the separation of dissolved substances (e.g., salts) from solvents (e.g., water) by the process of reverse osmosis. Potable, or less salty water, can be obtained from seawater, contaminated water, brackish water, or brine by reverse osmosis. Reverse osmosis is also useful to prepare "soft" water or relatively deionized water or water with reduced "total dissolved solids" from relatively "hard" water by the same or similar technique. The preparation of soft water can be important in industry and residential, e.g., for providing a relatively "soft" (calcium- and magnesium-free) water from a relatively "hard" tap water. U.S. Pat. No. 4,277,344 is incorporated herein by reference.

Interfacially polymerized thin film composite membranes are formed insitu on a supporting surface, e.g., through chain extension and or crosslinking of monomers and/or prepolymers. By forming the thin film polymeric discriminating layer insitu, the thin film need not be soluble in any solvent. Interfacially synthesized discriminating layers can thus be crosslinked polymers. For casting, polymeric discriminating films must necessarily be soluble in some solvent and consequently must exhibit a low crosslink density. Thin film composite membranes now receiving substantial commercial endorsement are obtained by condensing an essentially monomeric, polyfunctional acyl halide having a low aqueous solubility with a polyamine having a high water solubility at an interface created between the aqueous solution of amine reactant and immiscible solution of polyfunctional acyl halide reactant. Interfacial polymerization is also disclosed in U.S. Pat No. 4,277,344 as occurring between an aqueous polyamine solution and a vapor phase acyl polyacyl halide reactant. A generally more conventional interfacial polymerization technique involves contacting the polyamine solution with a substantially nonpolar organic liquid solution of the polyacyl halide.

Generally, the microporous support may be prepared by casting, for example on a glass plate, a solution of from 5 to 15 percent by weight polysulfone dissolved a suitable solvent such as dimethylformamide in a thin layer. The casting may be made thin and uniform by use of a draw knife having a thickness from 1 to 3 mm. Freshly cast polymer is then immersed in an aqueous bath containing a small amount of the solvent, i.e., from 0.01 to 5 percent, to cause coagulation of the polymer. The surface of the film not in contact with the casting surface is used as the support for the formation of the interfacially polymerized discriminating layer.

Typical nonpolar solvents disclosed in the literature include $C_1$–$C_{12}$ aliphatic (including halogenated aliphatic) solvents such as the alkane (including halogenated alkane) solvents and the cyclo aliphatic solvents (typically having five or six carbon atoms and typically being fully saturated or having a very low level of unsaturation). "Liquid" solvents in this context, are solvents which are liquid under normal ambient conditions of temperature and pressure, (e.g., 20°–25° C. and 1 atmosphere). Heretofore, conveniently used solvents include $C_1$–$C_3$ halogenated aliphatics, the $C_5$–$C_6$ alkanes, $C_5$ and $C_6$ cycloaliphatics. Suitable solvents for the polyacyl halide do not tend to initiate chemical attack or physical attack on commonly used substrate materials. The porous substrate frequently is prepared from polysulfone. Consequently, the chemical composition of the substrate may limit the use of some $C_1$–$C_3$ halogenated aliphatics as solvents for the polyacyl halide. Alkane and cyclo alkane solvents do not exhibit strong attack on substrates such as polysulfone. The hydrocarbon solvents including $C_1$–$C12$ aliphatic as disclosed are combustible. 1,2,2-trichloro-1,1,2-trifluoroethane is a useful solvent because of its limited toxicity and safety in terms of flammability.

Recently, the environmental concerns related to "ozone depletion" have focused on solvents having environmental characteristics more favorable than low molecular weight alkanes, chlorinated alkanes, and volatile fluorochlorocarbon solvents such as are marketed under the E. I. Dupont de Nemours trademark FREON. 1,2,2-trichloro-1,1,2-trifluoroethane is marketed as Freon TF. Although the interfacial polymerization is possible with solvents for the polyacyl halide having higher boiling points such as $C_8$–$C_{12}$ aliphatic solvents, it is believed that commercial implementation of the process of preparing thin film composite membranes, particularly the preparation of thin film composite polyamide membranes has focused on lower boiling solvents such as Freon TF and hexane in order that the solvent might readily be removed from the membrane surface by evaporation. Such solvent removal methods are disclosed in U.S. Pat. Nos. 4,277,344; 4,783,344; 4,749,488; 4,859,384; 5,015,382; and 5,015,380. It is noted in U.S. Pat. No. 4,761,234 that n-hexane and trifluoro-trichloroethane are preferred solvents "for the reaction rate and volatility of the solvent." The preference for trifluoro-trichloroethane because of its low flammability is expressed.

Heretofore the art has taught that the use of higher boiling solvents such as $C_8$ to $C_{12}$ alkanes requires the use of extraordinary means, including elevated temperatures, to remove the higher boiling organic solvent by means of a heat-induced evaporation (phase change) in an oven at temperatures from 60° to 120° C. It is disclosed in U.S. Pat. No. 4,948,507 that a monomeric amine salt such as triethylamine camphor sulfonic acid is a necessary ingredient of the aqueous polyamine reactant solution to avoid a loss of flux when the composite membrane is heated at an elevated temperature for the purpose of removing a higher boiling solvent such as Isopar TM. Isopar TM is a trademark of Exxon Corporation for high purity isoparaphenic solvents.

Higher boiling solvents are more recently suggested as a solution to the environmental risk attributed to chlorofluorocarbon solvents and the safety risk posed by lower boiling alkanes such as n-hexane or cyclohexane. It is disclosed in European Patent 0 503 596 A2 that, in the manufacture of interfacially polymerized thin film composite membranes, a step of evaporating the solvent is required after the polyfunctional acyl halide reactant is contacted with the reactive monomer, frequently a polyfunctional amine. The use of higher boiling solvents for the polyfunctional acyl halide reactant is reported to result in membranes exhibiting a low water flux. It is also reported that the application of heat to assist in the evaporation of the solvent resulted in membranes having extremely low water flux. A solution proposed in EP 0 503 596 A2 is to assist the evaporation of the high boiling solvent by blowing humid gas, such as air, over the surface of the membrane to aid in the evaporation of the solvent. The effect of accelerating the evaporation by moving gas over the membrane surface is believed to minimize the adverse effect which the exposure of the membrane to extended elevated temperature has on the flux upon the membrane. The gas velocity disclosed is between 2 and 20 m/sec at a temperature of 10° to 80° C. provided that the temperature is lower than the flash point of the solvent.

It is further disclosed in EP 0 503 596 A2 that removal of the solvent by evaporation is necessary to cause the concentration of the crosslinking agent, e.g., a polyfunctional acid chloride such as trimesoyl-chloride, in order to promote the crosslinking reaction. The crosslinking reaction is claimed to be complete when the solvent is completely evaporated. It is further disclosed that even at elevated temperatures it is necessary that a gas enhanced evaporation of solvent for the polyfunctional acid halide reactant requires more than a minute of time. Reduction of the time necessary for removal of the solvent for polyacyl halide reactant would result in a more desirable manufacturing process. For a solvent having a low volatility, it is stated the reaction time will be too long resulting in an undesirably thick crosslinked layer resulting in a low water flux. The solvents disclosed in EP 0 503 596 are as listed, and have the following vapor pressures and flash points:

| Solvent | Flash Point (°C.) | Vapor Pressure (psig) |
|---|---|---|
| octane | 22 | 3.71 |
| n-nonane | 30 | 1.2 |
| n-decane | 44 | 0.69 |
| n-undecane | 65 | — |
| n-dodecane | 71 | — |
| cyclooctane | — | — |
| ethylcyclooctane | — | — |
| 1-octene | 21 | 4.5 |
| 1-decene | 49 | — |
| hexane | −23 | 34 |
| cyclohexane | −12 | 24 |

Source: E. Flick, Industrial Solvents Handbook, Noyes Publishing Co. (1991).

Since a further measure of safety is secured by the use of water immiscible solvents for the polyfunctional acid halide reactants which have flash points and boiling points higher than those disclosed in EP 0503596, even longer evaporation times would be required in a manufacturing process.

There is a need for a method of making a reverse osmosis composite membrane having a thin film, interfacially reacted, discriminating layer having a reaction time less than 1 minute. There is also a need for a method of removing the solvent which does not require elevated temperatures or additives to the amine reactant solution.

After extensive efforts, the Applicants have determined that evaporation of the solvent as disclosed in EP 0 503 596 and as heretofore practiced in the art, is not necessary.

The Applicants have discovered that the organic solvent may be physically removed from the membrane. When properly directed upon the membrane surface, water or air may be used to quickly and adequately remove the organic solvent and the acyl halide reactant without the loss of flux or salt rejection. Other physical methods including a roller, or combinations of physical methods, are useful to remove organic solvent. These methods of removal of the water immiscible solvent from the membrane has the additional benefit and feature that the solvent does not change phase, e.g., from liquid phase to gas phase on removal from the membrane. The physical removal of the water immiscible solvent is contrary to the previously understood belief that the solvent must be evaporated in order to complete the crosslinking step of the membrane formation. Moreover a combination of physical removal of organic solvent and reactant yields a removal of greater than 70 percent of the solvent (and reactant) present, preferably greater than 90 percent, more preferably greater than 98 percent, most preferably greater than 99 percent. Additional organic solvent removal may be accomplished by evaporative phase change. Removal of solvent by physical means, or by a combination of physical means and evaporation, yields membranes having good flux, and good rejection. Furthermore, the method may be used with solvents which are cost effective, environmentally responsible, and have a high flash point.

The water useful for physical removal of the organic solvent can be applied to the membrane at any temperature at which the water is liquid, i.e., from 0° to 100° C. Because the water can be in contact with the membrane only a short time, little adverse consequences to the polymeric support from an elevated temperature occurs.

A further feature of the invention is that by use of low temperature water for solvent removal a relatively volatile solvent such as a solvent having a flash point of 30° C. or less may be employed with greater safety. Low temperature water, i.e., less than 10° C. may be combined with a comparatively volatile organic solvent having a low flash point in a safe manner.

By removing the solvent in the liquid phase, the occurrence of an explosive vapor mixture of solvent and air even though the temperature is above the flash point, may produce a safe operating condition for solvents having flash points less than 0° C. including hexane and cyclohexane.

The Applicants' discovery eliminates the need for the addition of drying aids such as monomeric amine salts. The Applicants' discovery also eliminates the need for extraordinary safety measures required when heating the solvent laden membrane.

DESCRIPTION OF EMBODIMENTS

Figure 1:
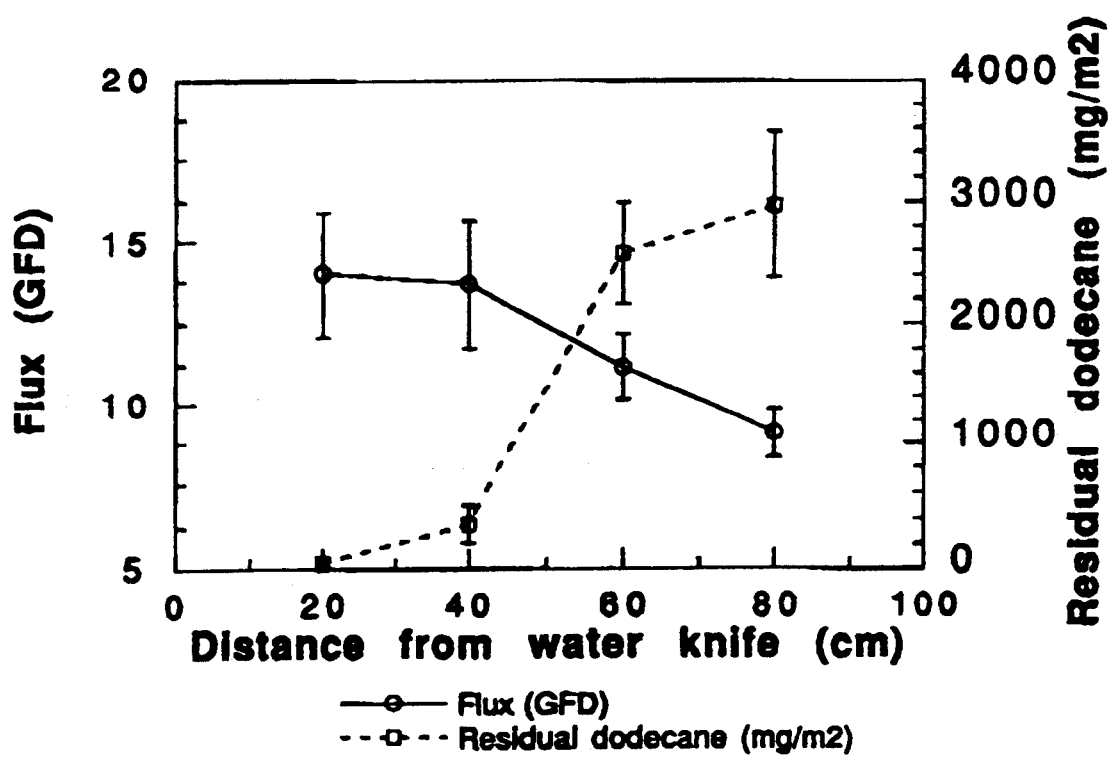
FIG. 1 describes the relationship between the removal of organic solvent and the distance from the water knife.

The present invention concerns semipermeable membranes comprising a microporous substrate and an ultra-thin membrane coated on the microporous substrate wherein the ultra-thin layer comprises a crosslinked polyamide. Thin film composite membranes wherein the thin film discriminating layer comprises a polymer other than a polyamide such as polyurea, are also contemplated within the scope of the invention.

In a preferred embodiment of the invention, a microporous support is coated with a polyfunctional reactant such as a polyamine. The polyamine may be primary or secondary in nature and may be selected from aliphatic or aromatic polyamines. The aliphatic polyamine may be linear or cyclic. Useful aliphatic polyamines include ethylenediamine, polyethylenediamine, n-cyclohexanediamine, cyclohexanetriamine, and piperazine. Useful aromatic polyamines include phenylenediamine such as m-phenylenediamine, p-phenylenediamine, and tri-aminobenzene.

A preferred form of polyamine has an aromatic nucleus of one or more aromatic rings. Aromatic polyamines having a plurality or aromatic rings are preferably independent rings rather than fused rings.

In order to be soluble in watery or other solvent immiscible with the solvent for the polyfunctional compound there is advantageously a "bridge" between aromatic rings. It is further advantageous for the bridge to have a "polar" or "hydrophilic" character to facilitate solubility of the polyamine reactant in water, or other solvent immiscible with the solvent for the polyfunctional compound. The aromatic nucleus of the polyamine may be carbocyclic, or heterocyclic.

Substituted polyamines are also useful if the substituents do not interfere with the formation of crosslinks in the thin film discriminating layer. Substituents such as —H, OCH$_3$, —CH$_3$, C$_2$H$_5$, —C$_3$H$_7$, —SO$_3$H, —COOH, —NHCH$_3$, —COCH$_3$, —F, —Cl, and —Br are useful. Substitution immediately adjacent to a carbonyl or amine group of an amide bond is not suggested because of steric interference with the desired reaction.

Water is the most advantageous solvent for the polyamine reactant. However, solvents other than water which dissolve from 0.5 to 40 percent polyamine are within the scope of the invention. Such solvents include polyethylene glycols.

The degree of functionality of the amine reactant is at least two. The reactant solution may be comprised of a mixture of reactants. A mixture of polyfunctional reactants should have an average functionality greater than two.

The organic soluble reactant is advantageously an acyl halide. The functionality of the acyl halide is at least two. This solution may be comprised of a mixture of compounds. The mixture of compounds should have an average functionality greater than or equal to two.

Suitable polyfunctional compounds reactive with the polyfunctional amine reactants include diisocyanates, for example aliphatic diisocyanate such as diisocyanotohexane and preferably aromatic diisocyanates such as toluene diisocyanate. Also preferred are acyl halides, (including their functional equivalents such as acid anhydrides) such as isophthalyl chloride, terephthaloyl chloride, and trimesoyl chloride.

Bridge linkage between aromatic nuclei may comprise a single bond, or a divalent group capable of bonding two aromatic rings, for example: —NHCO—, —SO$_2$—, —S—, —COO—, —CH$_3$CCH$_3$—, and —O—.

Suitable solvents for the acyl halides are nonpolar liquids such as substituted or unsubstituted aliphatic, alicyclic, or aromatic hydrocarbons in which the acyl halides have a solubility of at least 0.01 percent by weight. Typical solvents for polyacyl halide are C$_5$ to C$_8$ alkanes. Halogenated alkanes (C$_1$ to C$_4$) have also been used. Alkanes up to C$_{12}$ are disclosed in U.S. Pat. No. 4,277,344 as suitable as solvents for polyacyl halides. In commercial practice the volatility of the organic solvent has been a significant feature as stated in U.S. Pat. No. 4,761,234. The safety advantages of 1,1,2-trichloro-1,2,2-trifluoroethane as solvent for acyl halides is also stated in U.S. Pat. No. 4,761,234.

Useful solvents in the present method of manufacture include the solvents heretofore disclosed and those preferred including hexane and 1,1,2-trifluoro-1,2,2-trichloroethane. A useful feature of the present method is its utility with solvents having low vapor pressures which in many cases, for flammable solvents, corresponds to safer high flash points, (the temperature at which the vapor forms an ignitable mixture in air near the liquid). In addition to the popular solvents, the present method is useful for the physical removal of organic solvents having vapor pressures at 38° C. of 30 kPa and lower even to 5 kPa, and as low as 0.5 kPa, and lower.

It has now been found that solvents having a low volatility may be used and that the resulting flux of the thin film composite membrane is influenced by the residual solvent. Advantageously the associated solvent, adsorbed on the surface and/or contained in the barrier layer is preferably less than 1000 mg/m$^2$, more preferably less than 500 mg/m$^2$, most preferably less than 100 mg/m$^2$, even more preferably is residual solvent amounts less than 50 mg/m$^2$.

Various physical methods are effective for removal of low volatility solvents. Scraping, water sprays, gas sprays, and nip rolling are found effective. A means of removing organic solvent as a "nip" may include a turn roller on a continuous membrane sheet wherein the membrane layer having the discriminating layer thereon is in tension against a turn roller. Table 1 shows a variety of physical methods for removal of low volatility solvents and the comparative effectiveness of each method.

EXAMPLES

Comparative Example 1

Composite reverse osmosis membranes were prepared starting from generally well-known methods. The microporous support may be prepared from a variety of polymeric materials in addition to polysulfone, including polyethersulfone, chlorinated polyvinyl chloride, polystyrene, and cellulose esters. The pore sizes of suitable supports is from 0.001 to 1 μm, preferably the pore size, as determined by electron microscope on the surface in contact with the thin film discriminating layer is from 0.01 to 0.1 μm. Supports prepared from polysulfone are widely used commercially. Preparation of suitable supports is described in U.S. Pat. Nos. 3,926,798 and 4,039,440, and in OSW R&D Progress Report No.

359 of October 1968. The disclosure of these references is incorporated herein by reference in their entirety.

The membrane support is then contacted with an aqueous solution 2.5 percent by weight of m-phenylenediamine. After nip rolling, the exposed surface of the microporous support is then contacted with 0.12 percent by weight solution of trimesoyl chloride in a solvent immiscible with water. A thin film discriminating layer forms at the interface of the solution of the polyfunctional compound and the support.

The organic solvent for the trimesoyl chloride is n-dodecane. Example 1 serves as a control. No physical removal of the solvent is attempted. All examples are performed in triplicate unless otherwise noted. Results of reverse osmosis testing at 225 psig with 2000 ppm NaCl and residual hydrocarbon are reported in Table 1 for examples 1 to 8. Residual hydrocarbon is determined by gas chromatography.

Example 2

A composite membrane is prepared according to the procedure of Example 1 on a machine cast polysulfone microporous membrane support except that the composite membrane after one minute reaction time is immersed for 5 seconds in a water bath.

Example 3

A composite membrane is prepared according to Example 1 except that immersion in water was performed after physical solvent removal. Solvent removal was accomplished with a red silicone rubber blade. The blade is advanced at about 2 cm/sec. The applied force is approximately 20.5 g/cm of length of the rubber blade.

Example 4

A composite membrane is prepared according to Example 1 except that the solvent was removed with the use of a silicone rubber covered roller. The roller was applied with a force of 0.3 kg/cm. The roller contacts the composite membrane for about 4 mm of the roller circumference. The roller is advanced along the membrane at about 2 cm/sec.

Example 5

A composite membrane is prepared according to Example 1 except that a gas spray using air is used to physically remove the organic solvent. Such a gas spray is frequently called an air knife. The air knife is advanced past the membrane at a rate of about 2 cm/sec. At the membrane surface, the ambient air has a velocity measured near the membrane surface greater than 100 ft/sec.

Example 6

A composite membrane is prepared according to Example 1 except that a water knife is used to physically remove the solvent. The water knife used in this case consists of a fan of water from a nozzle. The expression "water knife" is not limited to a water spray from a single nozzle or water source but includes a plurality of water sources and may include a spray pattern which is linear, oval, circular, or any combination thereof. The water nozzle (Spraying System Co. Flat Jet, 1/4P 3510, 316SS) had a 35° spread. Water is sprayed on thin film discriminating layer from a distance of 20 cm. The water knife impacts the membrane perpendicular to the membrane surface. The water is ambient temperature. The membrane advances lengthwise under the water knife at 16 cm/sec. The water nozzle is pressurized to 276 kPa (40 psig). The water flowed on the membrane surface at a volume of 0.063 liter/sec (40 gpm) per nozzle or 0.005 liter per seconds per cm of membrane width.

Example 7

A composite membrane is prepared according to Example 4. After rolling the thin film composite layer according to the procedure of Example 4 the membrane is washed with the water knife according to Example 6.

Comparative Example 8

A thin film composite membrane is prepared according to Example 1 except hexane is substituted for dodecane. The hexane is permitted to evaporate for 2 minutes following the polyamide forming reaction. The membrane appears dry after 45 seconds.

TABLE 1

| Example | Dodecane Remaining (mg/m$^2$) | St. Dev. (mg/m$^2$) | Flux (GFD) | St. Dev. (GFD) | Salt Passage (%) | St. Dev. (%) |
|---|---|---|---|---|---|---|
| Comp. 1 | 21807 | 2379 | 9.96 | 1.66 | 1.92 | 1.07 |
| 2 | 12840 | 1893 | NT | — | — | — |
| 3 | 1296 | 350 | 12.42 | 2.53 | 10.89 | 1.75 |
| 4 | 289 | — | 7.32 | 3.69 | 1.22 | 0.42 |
| 5 | 292 | 75 | 14.86 | 0.56 | 1.31 | 0.38 |
| 6 | 47 | 22 | 14.00 | 1.90 | 2.63 | — |
| 7 | 63 | 48 | 11.95 | 1.09 | 1.73 | 1.18 |
| Comp. 8 | — | — | 9.43 | 0.77 | 1.13 | 0.15 |

Examples 10-13

A composite membrane is prepared following the steps of Example 6. Using a water knife having a constant flow rate, water pressure and water volume the significance of the efficiency of solvent removal is determined with respect to the distance of the membrane from the water knife. In all cases the membrane is perpendicular to the water knife. Results are in Table 2.

Individualized conditions may change the results of efforts to remove solvent from a composite membrane according to variance of factors such as the particular solvent chosen, the water knife used, the water flow rate, the water knife angle with respect to the membrane, and the distance of the membrane from the water knife.

TABLE 2

| Ex. | Distance (cm) | Dodecane Remaining (mg/m$^2$) | St. Dev. (mg/m$^2$) | Flux (GFD) | St. Dev. (GFD) | Salt Passage (%) | St. Dev. (%) |
|---|---|---|---|---|---|---|---|
| 10 | 20 | 47 | 22 | 14.00 | 1.90 | 2.63 | — |
| 11 | 40 | 353 | 148 | 13.69 | 1.96 | 2.98 | 0.17 |
| 12 | 60 | 2569 | 417 | 11.16 | 1.03 | 2.93 | 0.75 |
| 13 | 80 | 2968 | 595 | 9.07 | 0.77 | 3.20 | 0.46 |

Examples 14-17

Composite membranes are prepared according to Example 6 except that n-dodecane is substituted by the solvent indicated in Table 3. The residual solvent and flux appears in Table 3.

TABLE 3

| Example | Solvent | Solvent Remaining (mg/m²) | Standard Deviation | Flux (GFD) | Standard Deviation | Salt Passage (%) | Standard Deviation |
|---|---|---|---|---|---|---|---|
| 6 | dodecane | 47 | 22 | 14.00 | 1.90 | 2.63 | — |
| 14 | decalin | 29 | 16 | 10.17 | 4.70 | 3.03 | 1.16 |
| 15 | n-nonane | 27 | 8 | 22.44 | 0.53 | 1.82 | 0.75 |
| 16 | n-tetradecane | 901 | 185 | 13.49 | 1.89 | 1.54 | 1.09 |
| 17 | Isopar ™ L | 15 | 18 | 16.67 | 1.80 | 1.49 | 0.44 |

Isopar ™ is a trademark of the Exxon Company for an isomeric mixture of isoparafins.

Examples 18–29

Composite membranes are prepared according to Example 6 except the water knife angle of incidence with the membrane surface, the water pressure, and the water nozzle are varied according to Table 4.

Nozzle 3510 has a 35° spray angle at 40 psi

TABLE 4

| Example No. |
|---|
| 18 |
| 19 |
| 20 |
| 21 |
| 22 |
| 23 |
| 24 |
| 25 |
| 26 |
| 27 |
| 28 |
| 29 | and 1 gallon per minute. Nozzle 3504 has a 35° spray angle at 40 psi and 0.4 gallon per minute. Nozzle 5010 has a 50° spray angle at 40 psi and 1 gallon per minute.

What is claimed is:

1. A process for preparing a composite membrane comprising:
   a) coating a porous support with a first solution comprising a polyfunctional reactant and water;
   b) contacting the first solution on the porous support with a second solution, which is immiscible with the first solution, the second solution comprising a second solvent and a polyfunctional compound reactive with the polyfunctional reactant, such that an interfacial reaction occurs between the polyfunctional reactant and the polyfunctional compound forming a film on the porous support; and
   c) removing, without a phase change, at least 70 percent of any excess polyfunctional compound and second solvent from the porous support and film by physical means.

2. The method of claim 1 wherein the physical means of removal of step (c) is selected from the group consisting of: water spray, gas spray and nip roller.

3. The method of claim 1 wherein the composite membrane is a reverse osmosis membrane.

4. The method of claim 2 wherein the physical means is a water spray applied such that an angle of incidence of between 0° and 90° is formed by water spray and the surface of the composite membrane.

5. The method of claim 4 wherein the angle of incidence of the water spray is between 5° and 25°.

6. The method of claim 4 wherein the water spray is at a temperature of less than 30° C.

7. The method of claim 6 wherein the water temperature is less than 10° C. and the solvent has a flash point less than 0° C.

8. The method of claim 2 wherein the gas spray contains nitrogen.

9. The method of claim 1 wherein, without a phase change, at least 90 percent of any excess polyfunctional compound and second solvent is removed from the porous support and film thereon by said physical means.

10. The method of claim 9 wherein, without a phase change, at least 98 percent of any excess polyfunctional compound and second solvent is removed from the porous support and film thereon by said physical means.

11. The method of claim 10 wherein, without a phase change, at least 99 percent of any excess polyfunctional compound and second solvent is removed from the porous support and film thereon by said physical means.

* * * * *